US008254976B2

United States Patent
Harris

(10) Patent No.: US 8,254,976 B2
(45) Date of Patent: Aug. 28, 2012

(54) RANGING COLLISION ELIMINATION FOR GROUP CALLS IN A COMMUNICATION NETWORK

(75) Inventor: John M. Harris, Glenview, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 966 days.

(21) Appl. No.: 12/265,171

(22) Filed: Nov. 5, 2008

(65) Prior Publication Data
US 2010/0112953 A1    May 6, 2010

(51) Int. Cl.
*H04B 7/00* (2006.01)
*H04W 4/00* (2009.01)
(52) U.S. Cl. ........ 455/518; 455/517; 455/41.2; 455/515
(58) Field of Classification Search .................. 455/519, 455/517, 518, 520, 515, 521, 509, 452.1, 455/414.2, 65, 452.2, 416, 415, 41.2; 370/229
See application file for complete search history.

(56) References Cited

U.S. PATENT DOCUMENTS

| 6,894,664 B2 * | 5/2005 | Thebault et al. ................. 345/60 |
| 2007/0184865 A1 * | 8/2007 | Phan et al. ..................... 455/509 |
| 2009/0168850 A1 * | 7/2009 | Harris ........................... 375/140 |

* cited by examiner

*Primary Examiner* — John J Lee
(74) *Attorney, Agent, or Firm* — Brian Mancini; Steven A. May

(57) ABSTRACT

A network entity and method for eliminating ranging collisions for a group call in a communication network includes a step 300 of provisioning a pre-established rule for all members of a group, the rule including a common random number generator seed. A next step 302 includes initiating a group communication to subscriber units belonging to a group. A next step 304 includes generating a list of unique ranging codes for the members of the group using the common seed. A next step 306 includes each member of the group transmitting on its unique ranging code.

20 Claims, 3 Drawing Sheets

RANGING COLLISION ELIMINATION FOR GROUP CALLS IN A COMMUNICATION NETWORK

FIELD OF THE INVENTION

The present invention relates generally to an apparatus and method for eliminating ranging collisions in response to a group communication in a communications network.

BACKGROUND OF THE INVENTION

Group communications are becoming more important aspects of telecommunication networks, and the demand for such services will continue to increase. For instance, there are presently many different systems and networks that allow group communication. Public safety organizations are particularly interested in group communications and dedicated resources are being provided for these organizations. Businesses and even personal users also have a desire to use group communication. As a result a suite of protocols have already been developed for use in group communications. These protocols are used to control interactive communications sessions including data streams such as audio (voice), video, text messaging, and internet protocols, for example between, or to, users (also referred to herein as subscribers) in a communications network. Each subscriber is typically associated with a communications device (also referred to herein as a subscriber unit, access terminal, user equipment, and the like) that is used to connect to the communications network.

In practice, a dispatcher can set up a group call with a defined set of users. The group call consists of establishing a communication session. For example, a dispatcher can initiate a session by sending a page containing a list of all subscriber units of a particular group. Alternatively, the dispatcher can use a Group ID associated with that group instead of a list of individual members. For example, a dispatcher can initiate a session by sending a group page to a large number of subscriber units of a particular group by just using a Group ID in a single page for that group.

A subscriber unit that is paged to join the group call is required to respond to the page before being able to join the session. In particular, upon receipt of the page, the subscriber units associated with that group respond by performing private ranging using a randomly number that they generate for their individual access codes. Using random number access codes allows subscribers units to be individually identified. However, the actual number of random access codes is limited, and it may be that different subscriber units generate the same access code. Therefore, not only will there be ranging congestion from all the subscriber unit that are ranging within a short timeframe, there is a real possibility that there will be ranging access code collisions between identical codes, which could prevent some subscriber units from properly joining the group call session, which is not desirable for sensitive communications such as in the area of public safety.

One solution to this problem has been to pre-define a separate, dedicated code for each subscriber unit to use, within a page. However, this is difficult to implement in practice as this may result in an uneven loading across the Ranging Codes, and consequently unequal Ranging Code blocking probabilities across the subscriber devices. Additionally, this may be difficult to implement in practice as this may require additional bits in the page message to indicate which dedicated codes are being allocated for the group members to respond, and how many members are in the group (so that others who are not part of the group will know which codes they are not allowed to use). Additionally, with some other solutions there are additional inefficiencies when the members of a group can change, requiring a complete redefinition for all members of the group from the dispatcher every time there is a change in membership. Furthermore, dedicating codes to UEs within a group may also require the reserving of codes for the group members and every cell where group members may exist (e.g., across the paging area). This consumes additional capacity, reserving codes, which will not actually be used because that particular UE is in a different cell.

Another solution would be to separate ranging responses in time (and possibly as well in code). However, separation in time (or time and code) introduces delay to the channel setup time in the order of few quantum units, where the delay is proportional to the number of group members in a sector multiplied the delay for each. For large groups, these serialization delays can increase call setup times beyond what is acceptable for certain systems, especially public safety dispatch systems, while also reducing the instantaneous capacity in the sector.

Therefore, a need exists for a technique that reduces ranging congestion and collisions for group calls in a communication network.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

The present invention provides a technique that reduces ranging congestion and collisions for group calls in a communication network. The technique described herein addresses the problem of paging large groups of subscriber units using a Group ID as well as subscriber units that receive individual pages. Specifically, the present invention introduces the use of a quasi-random access code generation that avoids the need for a group communication to specify either the number of members in the group in the page message, or the block of codes to be used by a ranging response.

Advantageously, the present invention significantly reduces the congestion and collisions which result when group members subsequently perform private ranging. For group members, this reduces collisions by about ten times because they are known to not collide with other members of that group for codes. For example, if each group member randomly selects a code from the overall group of codes, then at the time of a group page the code blocking probability is ten times larger than when there is no group page. The present invention also works well when multiple groups are being paged simultaneously, as it avoids unevenly loaded codes, and the case where all of the groups ranging attempts will overlap all of another group's ranging attempts, e.g. the correlated collision problem—where each group member in each group uses the immediate next code relative to the previous group member in the same group.

The present invention is relevant where a group ID is used to address a group or in those technologies where a group page is not available and where separate pages must be sent to each member of a group, and also applies in the case where a paging message does not include an additional field to indicate number of members in that group, so it cannot coordinate code usage among those being addressed by the page (or the single identify code is used as a shared response code).

Figure 1:
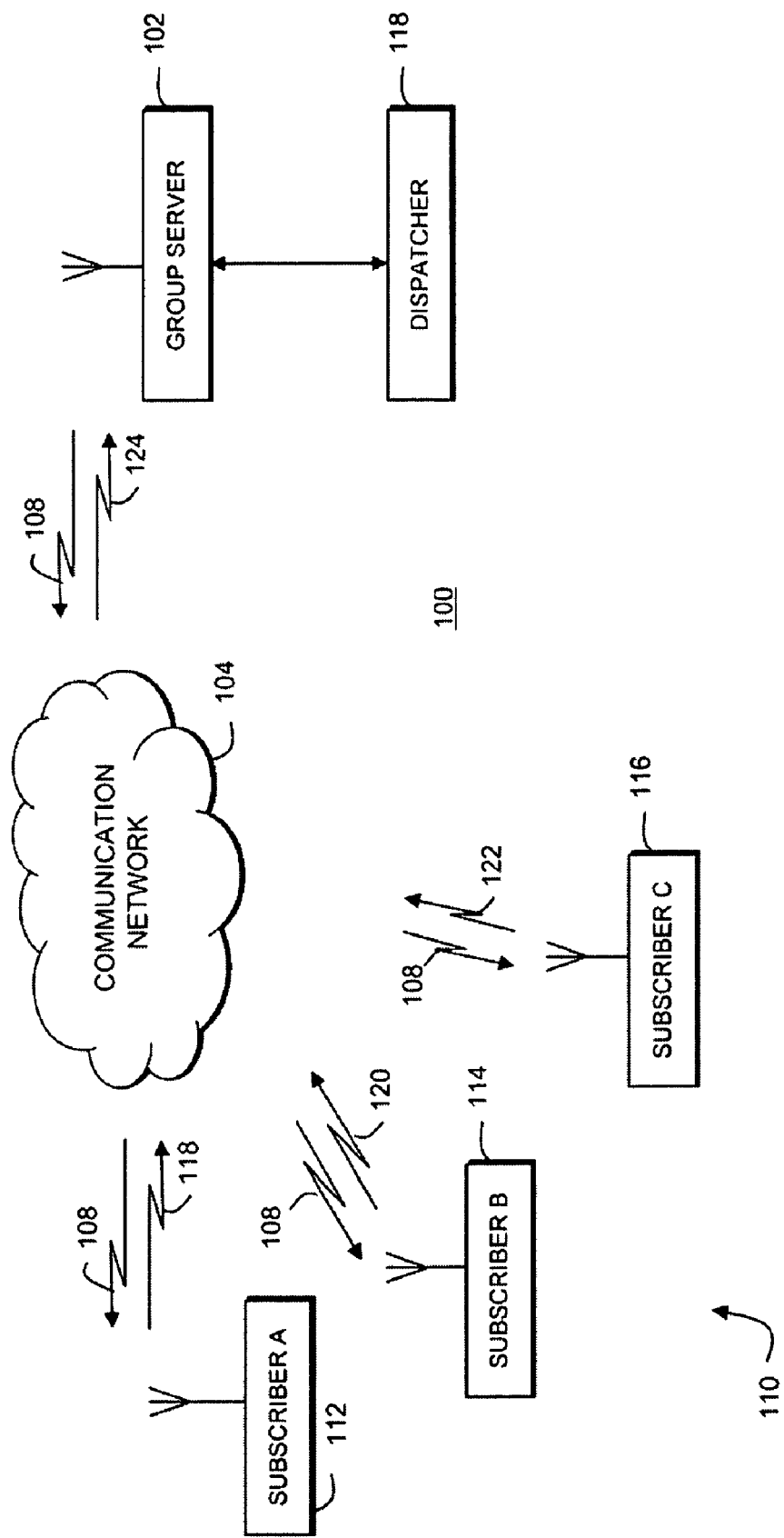
FIG. 1 illustrates a simplified block diagram of a communication network, in accordance with the present invention.

Referring to FIG. 1, the present invention provides for a group communication, such as can be implemented in a server-centric call control architecture 100 as shown. This architecture 100 may be included in a push-to-talk (PTT) communications system, for example. The architecture 100 includes a service entity (group server) 102, which may be for instance a PTT server, that can be communicatively coupled through a communication network 104 to a plurality of mobile or fixed subscriber units, shown here as three subscriber units A, B, C, 112, 114, 116 of a group 110, and optionally a dispatcher 118.

The group communication is a session supported by the group server 102, which is known to subscriber units 112, 114, and 116 of the group 110 as the target for all call control signaling, as is known in the art. Prior to establishing a group communication between a group server 102 and the subscriber units of a group 110, the group server should know the group affiliation (e.g. a predefined group affiliation or a Group ID) of the subscriber units of the group 110. The subscriber units can be provisioned with a group affiliation or identification (Group ID) by a service provider, which is communicated directly to the group server 102. Alternatively, the group affiliation can be provisioned by another network entity including the dispatcher 118 or the group server itself 102. To setup a session, a dispatcher 118 establishes the group call and its required applications on the group server 102. Call control signaling identifies the subscriber units by their group affiliation.

The affiliated subscriber units 112, 114, 116 of the group 110 can be simultaneously paged in a group communication 108 that includes the group identification (group ID) of the group call or individually paged in separate messages. Ordinarily, the group communication 108 contains no other information other than a call is being setup for the invited subscriber units of the group. The group communication should then be acknowledged, wherein the subscriber units are typically required to go through a private ranging process 118, 120, 122 before participating in the group call.

Each subscriber unit 112, 114, 116 typically comprises a logical entity, e.g., a user, and a physical counterpart, e.g., a terminal, as part of a group entity 110 that is named and addressable at the application layer. The preferred transactional broadcast protocol is Session Announcement Protocol (SAP). However, it should be recognized that obvious variations of the present invention could be utilized in protocols such as Session Initiation Protocol (SIP) and Session Description Protocol (SDP), for example.

Those of ordinary skill in the art will realize that many other network entities may be part of the communication system. For example, the group server 102 can include many other entities which have not been shown for the sake of simplicity. For example, the group server can include one or more of a session controller, a group database manager, a registration manager, an application layer router, a group entity manager, a broadcast and unicast address manager, a policy manager, a floor controller, a media manager, and a bandwidth manager, among others, all of which are known in the art. It should be appreciated that the above described entities can be integrated in the same physical or logical network element (i.e. group server), or provided as separate physical or logical network elements.

A group server 102 or dispatcher 118 can initiate a group session using protocols known in the art. The group server 102 is configured for determining the set of subscriber units to pull into a session based on the group affiliation. The group affiliation may or may not be understood by all members when the session request is received by them. However, the present invention is applicable in either case.

In this embodiment of the present invention, the group server 102 signals the group communication session setup 108 for a group affiliation through either a single group page or individual pages to the subscriber units 112 of that group 110 through the network 104. This group communication 108 is sent from the group server 102 to the network 104, which forwards the group communication 108 to the subscriber units 112, 114, 116 using the appropriate communication protocol. Upon receiving the page, each subscriber unit of the paged group 110 will respond with the private ranging attempt 118, 120, 122, which may or may not collide with a duplicate code and/or cause ranging congestion within a short time period.

In accordance with the present invention, each of the subscriber units of the group 110 are previously provisioned with a pre-established rule for determining their particular ranging code to be used for their individual private ranging attempt. This rule can be stored in a memory. These codes would be used for ranging in those cases where the paging message does not specify the particular codes to be used by the subscribers. Further, this role may only be used when the page message indicates that it is addressing a group of mobiles. According to another embodiment, this rule might be used by the mobile in response to all pages addressing it, e.g. both private and group pages. Preferably, the rule is provisioned in the subscriber units by a service provider. However, it should be recognized that the rule can be provisioned by any of the entities of the network, including the group server 102 or dispatcher 118, for example. The rule can be fixed or dynamically changed. For example, the rule could be permanently provisioned by a service provider upon having the subscriber unit initially register with the service provider. In another example, the dispatcher can change the group affiliation of a subscriber unit, whereupon that subscriber unit is re-provisioned with a new rule. In any event, when a subscriber unit joins a newly formed group or a new member joins an existing group it can be provisioned with a new rule.

In accordance with the present invention, the provisioning rule allows a subscriber unit of a group to generate its own unique quasi-random ranging code, such that no other subscriber unit in the group will share that ranging code. As a result, subscriber units within a group will no longer have a ranging code that is the same number as another member of the same group and that could cause a collision—while being random relative to previous codes selected by the same mobile.

Figure 2:
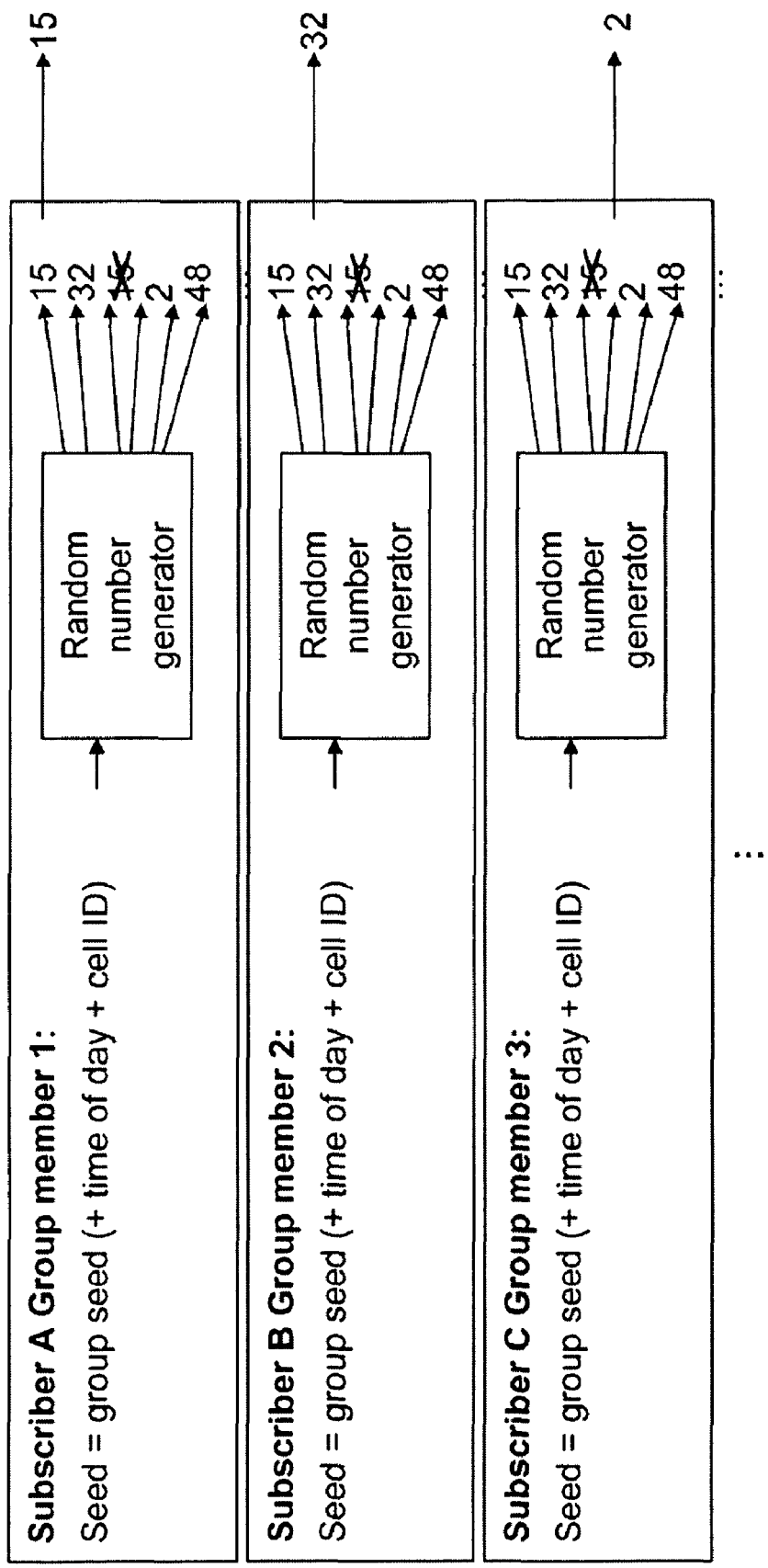
FIG. 2 illustrates quasi-random code generation, in accordance with the present invention.

Referring to FIG. 2, the pre-established rule provisioned in each member of a group includes the same seed for each member. In this way, upon receiving a page from a group server each member of the group will use its own random number generator to generate the same string of random numbers (15, 32, 15, 2, 48 . . . in this example) to be used as ranging codes. The pre-established rule also dictates that any number which repeats a previous number outputted from the random number generator for that paging event (e.g. group page) is discarded or skipped. In this example, the number fifteen was generated twice, and the rule dictates that the second generated number fifteen is discarded or skipped from the list of numbers, (i.e. 15, 32, 2, 48 . . . ).

Alternatively, the random number generator can include an input, which indicates how many random numbers are remaining. For example, a first random number generator can generate a random number between 1 and 64, this is the first unique number. This unique number is now said to be claimed or used. There are only 63 numbers which are not claimed or used at this point. The random number generator then generates another random number between 1 and 63, which can be call X1 in this example. The mobile station will count beginning with 1, up to the $X1^{th}$ number, which has not yet been claimed or used. If the $X1^{th}$ number reached has already been claimed or used, the $X1^{th}$ number plus 1 is used. If the $X1^{th}$ number plus 1 has already been claimed or used, the $X1^{th}$ number plus 2 is used, and so on. This will then be the second unique number. It should be noted at this point, there are 62 numbers which are not yet used or claimed. The random number generator then generates another random number between 1 and 62, and repeats the above procedure (1 through 61 . . . 1 through 1) until all the unique numbers are determined. This alternative technique results in similar results as before with a unique list of codes with duplicate numbers skipped.

The pre-established rule also includes an order assignment for each member of that group. The order assignment is permanently fixed for that subscriber unit when the pre-established rule is provisioned for that unit, i.e. when that subscriber unit is first affiliated with a particular group. In this example, Subscriber A is assigned to be the first member of the group, Subscriber B the second member, etc. As a result, Subscriber A gets the first unique number outputted from the random number generator to use as its private ranging code, Subscriber B gets the second unique number outputted from the random number generator to use as its private ranging code, and so on.

In those cases where there are more members of the group (e.g. 65) than the number of available ranging codes (e.g. 64), then those members must wait for the next page to perform their ranging attempt. For example, in a case where there are 64 possible ranging codes and there are over 64 members of the group, those members assigned with a order assignment over the number 64 must ignore the first page and wait until the next page, i.e. order assignment MODULO 64*(# of pages-1), wherein a member ranging code is only valid for a particular page when its order assignment is within the possible range of available codes.

In one embodiment, the particular seed used for a group can simply be the Group ID for that group or other group affiliation information. Optionally, the seed could include the cell ID. In this way, group members in neighboring cells will generate their own unique access codes, thereby avoiding collisions between cells. In another option, the seed could includes the time of day or a hash of the time of day, such that the common seed changes constantly, further mitigating the possibility of the same codes coming up all the time.

In further embodiments, the pre-established rule that is provisioned for all group members can establish a group hierarchy, which determines particular group members that may be required to respond to a particular page from the group server. Additionally, the pre-established rule can include the cell location of subscriber units. For example, in cell Z, where user X is typically located, user X does not need to wait for multiple ranging regions before transmitting on its code.

In another embodiment of the present invention, the block of quasi-random ranging codes is generated outside of each subscriber unit, such as can be done in the group server or dispatcher. In this case, the block of ranging codes can be specified for the group affiliation in the page message(s), and each subscriber unit would not need to generate the list on its own. The pre-established rule assigning group order assignments is still previously provisioned to the members of the group as before, so that the members of this group note which of the codes in this code block they should use to perform ranging.

Figure 3:
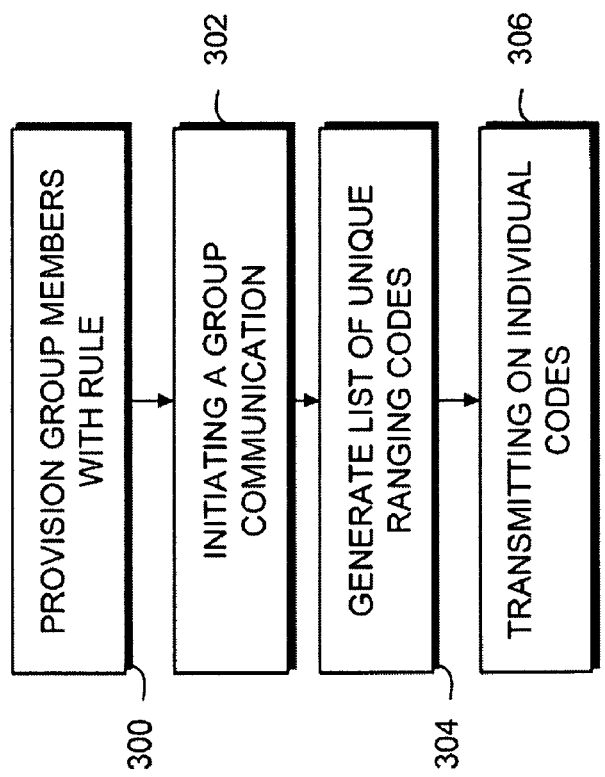
FIG. 3 illustrates a method, in accordance with the present invention.

FIG. 3 illustrates a method for eliminating ranging collisions for a group call in a communication network. The method includes a first step 300 of provisioning a pre-established rule for all members of a group, wherein the rule includes a common random number generator seed. The seed can include one or more of: a group affiliation or identification (e.g. Group ID) of the group members, a cell identification, and/or a time input such as a hash of the time of day. Preferably, the rule includes an assignment of group order for each member of the group. This group order indicates which device within the group should be able to use the first randomly generated unique code number, as opposed to the second, third, fourth . . . (as shown in FIG. 2). Optionally, the rule can include a group hierarchy which defines which group members are required in a group call. The pre-established rule may additionally take into account cell location, wherein a subscriber unit located in its typical cell does not need to wait for multiple ranging regions before transmitting on its code.

A next step 302 includes initiating a group communication to subscriber units belonging to a group. Preferably, the group communication includes the common random number generator seed. The group communication can be either a single group page to a group ID and conveying the common seed, or a set of separate private pages used to initiate a group call among members of a group and including the seed.

A next step 304 includes generating a list of unique ranging codes for all the members of the group by a random number generator using the common random number generator seed. The random number generator can be located within each group member subscriber unit. Alternatively, the random number generator can be located in another network entity, which requires that the list of unique ranging codes be sent in the initiating group communication step. Preferably, this step 304 includes discarding or skipping any code in the list which repeats a previous code outputted from the random number generator for that paging event.

Alternatively, this step 304 can have the random number generator include an input, which indicates how many random numbers are remaining. For example, a first random number generator can generate a random number between 1 and 64, this is the first unique number. This unique number is now said to be claimed or used. There are only 63 numbers which are not claimed or used at this point. The random number generator then generates another random number between 1 and 63, which can be call X1 in this example. The mobile station will count beginning with 1, up to the $X1^{th}$ number, which has not yet been claimed or used. If the $X1^{th}$ number reached has already been claimed or used, the $X1^{th}$ number plus 1 is used. If the $X1^{th}$ number plus 1 has already been claimed or used, the $X1^{th}$ number plus 2 is used, and so on. This will then be the second unique number. It should be noted at this point, there are 62 numbers which are not yet used or claimed. The random number generator then generates another random number between 1 and 62, and repeats the above procedure (1 through 61 . . . 1 through 1) until all the unique numbers are determined. This alternative technique results in similar results as before with a unique list of codes with duplicate numbers skipped.

A next step 306 includes each member of the group transmitting on its unique ranging code. Each member selects its own unique ranging code from the list per its assignment of group order from the pre-established rule.

It should be noted that the above steps can be implemented in any order, in accordance with the present invention.

Advantageously, when responding to a page, the present invention enables each subscriber unit to randomly select a code, while still completely avoiding access code collisions among members of the group. Each group member generates the same ordered list of unique random numbers and each subscriber unit knows its position within the groups such that no new group members choose the same code, which guarantees that each group member in the sector will have a distinct access code. As a result the code collision probability among the members of the group is reduced to essentially zero.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for eliminating ranging collisions for a group call in a communication network, the method comprising the steps of:
provisioning a pre-established rule for all members of a group, the rule including a common random number generator seed;
initiating a group communication to subscriber units belonging to a group;
generating a list of unique ranging codes for the members of the group using the common random number generator seed; and
each member of the group transmitting on its unique ranging code.

2. The method of claim 1, wherein the group communication of the initiating step includes a group page that includes the common random number generator seed, and wherein the generating step includes each member of the group generating its own unique ranging code using the common seed.

3. The method of claim 1, wherein the group communication of the initiating step is conveyed via separate private pages that include the common random number generator seed, and wherein the generating step includes each member of the group generating its own unique ranging code using the common seed.

4. The method of claim 1, wherein the generating step includes skipping any code in the list which repeats a previous code outputted from a random number generator for that paging event.

5. The method of claim 1, wherein in the provisioning step the rule includes an assignment of group order for each member of the group.

6. The method of claim 1, wherein the transmitting step includes each member selects its own unique ranging code from the list per its assignment of group order from the pre-established rule.

7. The method of claim 1, wherein in the provisioning step the common random number generator seed is a group identification.

8. The method of claim 1, wherein in the provisioning step the common random number generator seed includes a cell identification.

9. The method of claim 1, wherein in the provisioning step the common random number generator seed includes a time input.

10. The method of claim 1, wherein the generating step occurs in a network entity other than a subscriber unit, the initiating step includes the list in the group communication, and the generating step occurs before the initiating step.

11. A method for eliminating ranging collisions for a group call in a communication network, the method comprising the steps of:
provisioning a pre-established rule for all members of a group, the rule including a common random number generator seed and an assignment of group order for each member of the group;

initiating a group communication to subscriber units belonging to a group, the group communication including a common random number generator seed;

generating a list of unique ranging codes by each member of the group using the common random number generator seed; and each member of the group transmitting on its unique ranging code selected from the list per that member's assignment of group order from the pre-established rule.

12. The method of claim 11, wherein the generating step includes each member of the group skipping any code in the list which repeats a previous code outputted from a random number generator for that paging event.

13. The method of claim 11, wherein in the provisioning step the common random number generator seed is a group identification.

14. The method of claim 11, wherein in the provisioning step the common random number generator seed includes a cell identification.

15. The method of claim 11, wherein in the provisioning step the common random number generator seed includes a time input.

16. The method of claim 11, wherein in the provisioning step the rule includes a group hierarchy which defines which group members are required in a group call.

17. The method of claim 11, wherein in the provisioning step the rule includes a cell location, wherein a subscriber unit located in its typical cell does not need to wait for multiple ranging regions before transmitting on its code in the transmitting step.

18. A network entity for eliminating ranging collisions for a group call in a communication network, the network entity comprising:

a memory for storing a pre-established rule applicable for all members of a group, the rule including a common random number generator seed; and a random number generator for generating a list of unique ranging codes for the members of the group using the common random number generator seed, wherein upon a subscriber unit receiving a group communication, the subscriber unit is operable to transmit on its unique ranging code from the list.

19. The network entity of claim 18, wherein the network entity is a subscriber unit.

20. The network entity of claim 18, wherein the network entity is a group server.

\* \* \* \* \*